United States Patent [19]
Racich et al.

[11] Patent Number: 4,591,512

[45] Date of Patent: May 27, 1986

[54] METHOD OF MAKING LIGHT POLARIZER

[75] Inventors: James L. Racich, Natick; Norman W. Schuler, Lexington; Giorgio B. Trapani, Cambridge, all of Mass.

[73] Assignee: Polaroid Corporation, Cambridge, Mass.

[21] Appl. No.: 694,921

[22] Filed: Jan. 25, 1985

[51] Int. Cl.[4] .......................... B05D 5/06; G02B 5/30

[52] U.S. Cl. .................................... 427/163; 427/160

[58] Field of Search ................ 427/163, 160; 350/397, 350/398

[56] References Cited

U.S. PATENT DOCUMENTS 4,166,871 9/1979 Schuler .............................. 427/163

OTHER PUBLICATIONS

Racich et al., "High Efficiency Polarizers for the Visible Region", Proceedings of SPIE, vol. 464, Jan. 26–27, 1984.

*Primary Examiner*—James R. Hoffman
*Attorney, Agent, or Firm*—Gaetano D. Maccarone

[57] ABSTRACT

There is described a method for making visible range dichroic polarizer material comprising a uniaxially stretched film of polyvinyl alcohol stained with iodine and treated with a borating solution containing a zinc salt. The method comprises the steps of staining a uniaxially stretched sheet of polyvinyl alcohol and further stretching the stained sheet while it is being treated with a borating solution containing a zinc salt. High efficiency visible range dichroic polarizer elements having good neutrality, very high extinction and high transmittance can be made according to the method.

5 Claims, 3 Drawing Figures

METHOD OF MAKING LIGHT POLARIZER

BACKGROUND OF THE INVENTION

The application is directed to high efficiency visible range dichroic polarizer elements and to a method for making the polarizer material.

U.S. Pat. No. 4,166,871 discloses iodine-stained borated polyvinyl alcohol light polarizing elements in which zinc ions are incorporated. These light polarizing elements are highly efficient; they exhibit high absorbance across the visible spectrum when in the crossed position and good transmittance across the visible spectrum when arranged in the parallel position. However, as increasing demands are placed on the performance of such polarizer elements attempts to improve their properties continue to be made.

For example, when used in applications such as goggles worn to protect the wearer's eyes against flashblindness from exposure to sudden bursts of extremely bright visible radiation it is desirable that the polarizer elements have extinction properties which are as high as possible while at the same time providing a transmissive state which is as high as possible so as not to interfere with normal vision. Typically, however, the prior art polarizer elements exhibit a transmittance-extinction tradeoff. The most direct way to obtain higher extinction is to increase the concentration of the dichromophore. Unfortunately, as is well known to those skilled in the art, an increase in the dichromophore concentration unavoidably results in a lower photopic transmittance level.

The present invention is directed to visible range light polarizing elements which exhibit higher transmissivity for a given extinction level, i.e., elements which exhibit higher extinction without compromising on high transmissivity and to a method for making the polarizer material.

SUMMARY OF THE INVENTION

It is an object of the invention to provide improved visible range light polarizer elements.

It is another object to provide such elements which have very high extinction properties as well as high transmissivity properties.

It is a further object to provide a method for making improved polarizer material.

BRIEF SUMMARY OF THE INVENTION

These and other objects and advantages are accomplished in accordance with the invention by providing a method for making high efficiency visible range dichroic polarizer material comprising the steps of staining a uniaxially stretched sheet of polyvinyl alcohol by immersing it in an iodine bath and further stretching the stained sheet in substantially the same direction while it is being treated with a borating solution containing a zinc salt.

It has been found that it is possible to provide with polarizer material made according to the invention, polarizer elements which have very high extinction levels and high transmissivity. High efficiency dichroic polarizers are subject to theoretical limitations. A perfect dichroic polarizer will completely transmit one-half of the incident unpolarized light and completely absorb the other half. When reflection losses at the two surfaces (due to the index of refraction mismatch between the polarizer material and air) are included, the maximum transmittance for unpolarized light of a perfect dichroic polarizer in air is approximately 46%. As will be described in detail below, polarizer elements according to the invention can be made which have very high extinction and an unpolarized transmittance of 41–42%, thus providing a significant advance in the art.

BRIEF DESCRIPTION OF THE DRAWINGS

For a better understanding of the invention as well as other objects and further features thereof, reference is made to the following detailed description of various preferred embodiments thereof taken in conjunction with the accompanying drawings wherein.

DESCRIPTION OF THE PREFERRED EMBODIMENTS

A sheet of polyvinyl alcohol can be uniaxially stretched by techniques which are known in the art. The polyvinyl alcohol material used according to the invention is typically from about 0.038 to about 0.051 mm in thickness and preferably about 0.046 mm thick. The sheet is initially stretched uniaxially to between about 2.5 to about 4 times its normal dimension, preferably about 3.6 times, in an hot air oven at a temperature of about 125° C. An initially 0.046 mm thick, 940 mm wide, polyvinyl alcohol sheet stretched to approximately 3.6 times its normal dimension obtains a thickness of about 0.025 mm and a width of about 533 mm. In a preferred embodiment where it is desired to make highest efficiency polarizer material having uniformity of orientation an approximately 254 mm wide strip is taken from the center of the sheet and used in further processing.

The stretched polyvinyl alcohol sheet desirably should be free of splices, breaks and wrinkles and therefore it is preferred, prior to rewinding the stretched sheet to laminate it to a carrier material, for example an approximately 0.127 mm thick cellulose triacetate film which is subsequently removed prior to further processing.

Figure 1:
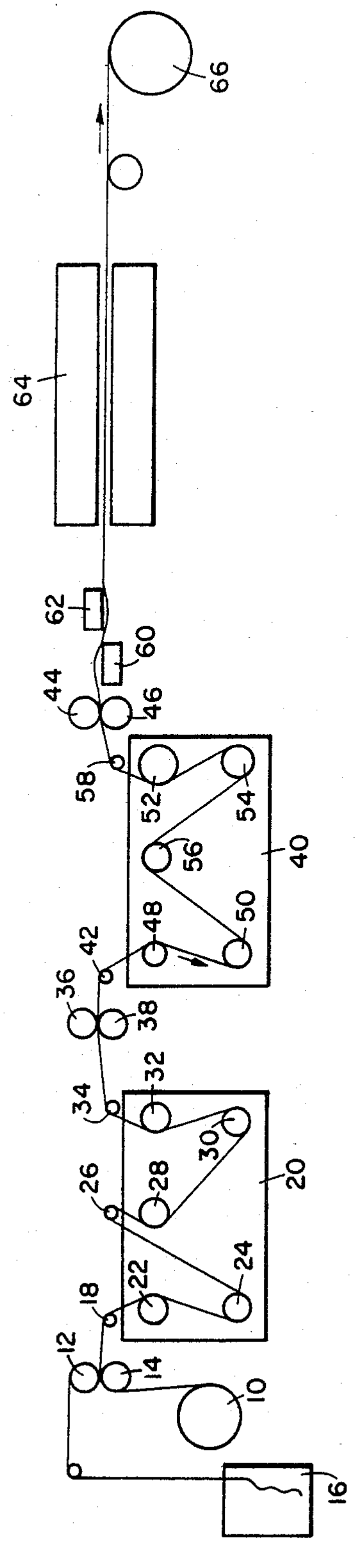
FIG. 1 is a schematic illustration of a preferred apparatus for carrying out the method of the invention.

Referring now to FIG. 1 there is seen a roll 10 of the stretched polyvinyl alcohol-cellulose triacetate laminate. The laminate is advanced through a pair of driven nip rolls, 12 and 14, and the cellulose triacetate film is removed and collected in container 16. The stretched polyvinyl alcohol sheet is then advanced over fixed bow roll 18 and enters the iodine stain bath in tank 20. The composition of the iodine stain bath is preferably iodine, potassium iodide and water, preferably in a ratio of 1/237/3727 by weight. The bath is maintained at temperature of about 30° C. ±2° and is gently recirculated by heating and recirculating means (not shown).

As is illustrated the polyvinyl alcohol sheet is immersed in the iodine stain bath. The rate of travel through the bath and the residence time therein are selected so as to permit the polyvinyl alcohol to become swollen substantially throughout its thickness and to permit the stain to penetrate into the sheet to a substantial extent from both surfaces. Generally, the stain will penetrate about one-third of the sheet thickness from each surface.

In one embodiment the sheet is made to travel through the ink bath at constant speed. In the arrangement illustrated, at a speed of about 0.3 meter/min any point on the polyvinyl alcohol sheet typically remains in the bath for about 5.4 minutes and at a speed of about 1 meter/min the immersion time is about 2.3 minutes. In another embodiment, the stretched polyvinyl alcohol sheet is relaxed, in the uniaxially stretched direction, typically by about 5 to about 15%, preferably about 7%, while it is immersed in the iodine bath.

The sheet is relaxed by causing it to be stretched uniaxially less than was initially the case. This can be done by releasing some of the force holding the sheet in its stretched condition to induce a slack in the stretched direction prior to immersion in the iodine stain bath and subsequently causing the sheet to become taut again while it is in the bath. For example, consider a polyvinyl alcohol film which has been uniaxially stretched approximately 3.6 times its normal dimension to a length of about 368 mm and placed in an adjustable clamp. When the clamp is retracted about 25 mm an approximtely 25 mm slack is induced in the film. The clamped film is then immersed in the iodine stain bath and allowed to remain therein until the film is taut again. With this procedure the film will have been relaxed by about 6.9%.

As is illustrated the polyvinyl alcohol sheet travels around free wheeling idler rolls 22 and 24, variable bow spreader roll 26 which has a large wrap angle, for example, about 200° and a high degree of bow, for example about 3.3°, and free-wheeling idler rolls 28, 30 and 32 before exiting from the bath and passing over variable bow spreader roll 34 which has a degree of bow of 2.6°, for example. Spreader rolls 18, 26 and 34 are rubber covered rolls and serve to prevent wrinkling of the sheet. It will be appreciated that variable bow rolls 26 and 34 would have differing angles of bow depending upon the line speed at which the sheet enters and leaves the iodine stain bath. For a speed of about 0.3 meter/min an immersion time of about 5.4 minutes and with variable bow rolls 26 and 34 having bow angles of 3.3° and 2.3° respectively, an initially 254 mm wide stretched polyvinyl alcohol sheet will obtain an approximately 7% increase in width as a result of the swelling effect of the bath and the spreading effect of the spreader rolls. The stained polyvinyl alcohol sheet is then passed through driven nip rolls 36 and 38 which maintain the web speed and squeeze excess ink from the sheet.

The stained sheet is then passed through a borating solution containing a zinc salt in tank 40. The borating solution may comprise potassium iodide, boric acid, zinc chloride and water, preferably in a ratio of 1.02/1.25/1.0/26.49, by weight. The sheet is again stretched, while it is immersed in the borating solution, typically by about 30% to about 100% of its dimension prior to entering the solution, dependent in part upon the extent of the initial stretching. Where the sheet was initially stretched about 3.6 times its normal dimension, it is typically stretched by about 35% to about 50%, preferably about 40%, of its dimension prior to entering the solution. The stretching is carried out in substantially the same direction, for example, within about ±3°, in which the sheet was initially stretched. The borating solution is maintained at an elevated temperature, for example, from about 55° C. to about 66° C., dependent in part upon the extent to which it is desired to stretch the sheet at this point. Higher temperatures are required for higher degrees of stretching. The extent of the stretching applied in the borating solution in any particular instance is dependent upon the extent of the initial stretching and the properties desired in the final polarizer material. Generally, it is preferable to make a polarizer material which is stretched in total from about 5 to about 5½ times the initial dimension of the polyvinyl alcohol sheet. Generally speaking, polarizer material having optimal polarizing properties is made by stretching the sheet as much as possible without breaking it.

The stained sheet travels around fixed bow, rubber covered roll 42 and enters the borating solution. The entrance nip, formed by rolls 36 and 38, and the exit nip, formed by driven nip rolls 44 and 46, are set for the desired surface speed increase, e.g. about 40–45%. Tracking rolls 48 and 50 are geared pairwise as are tracking rolls 52 and 54 and sized so as to constrain the web to stretch. Roll 50 has a larger diameter than roll 48 and roll 52 has a larger diameter than roll 54. Roll 56 is a free-wheeling idler roll. The borating solution is gently recirculated by recirculating means (not shown). In the instance where the sheet enters the solution at a speed of about 0.3 meter/min and leaves at a speed of 0.42 meter/min and immersion time is about 3.4 minutes at a temperature of 60° C., the width of the sheet leaving the solution is about 70% of that entering it. The borating solution typically permeates the entire thickness of the sheet.

It is preferred to have the borating solution preheated to from about 49° C. to about 52° C. when the web is threaded through the solution and to raise the temperature to the desired level as the web continuously moves through the solution. Generally the solution is maintained in the range of from about 55° C. to about 66° C. The temperature of the borating solution should be closely controlled near the desired level, e.g., within ± 1° C. Lower than desired temperatures can result in less than the desired degree of stretching and consequent lesser polarizer efficiency. A higher temperature can induce instabilities in the method such as excessive slack in the web, propensity for breakage of the web or both.

As the web leaves the borating solution it travels over fixed bow, rubber covered spreader roll 58, which prevents wrinkling, and excess borating solution is removed by nip rolls 44 and 46. Residual liquid and salt deposits are removed first from one side of the sheet and then from the other by cotton velour fabric wipers, 60 and 62, which are kept dry by a vacuum assist (not shown). The wipers typically have a diameter of about 90 mm and the sheet typically makes a 30° wrap angle around each wiper to introduce significant drag and high web tension. The web is then advanced through a forced-air, ambient condition drying oven 64, typically for about 1.5 minutes to about 4.5 minutes and then further dried by transport at ambient conditions before being rewound on roll 66. The width of the web typically decreases further by about 3%. The polarizer material is interleaved with 0.0254 mm thick polypropylene sheet (not shown) between adjacent wraps on the rewind roll.

The invention will now be described further in detail with respect to specific preferred embodiments by way of an example, it being understood that this is intended to be illustrative only and the invention is not limited to the materials, conditions, process parameters, etc.

which are recited therein. All parts and percentages are by weight unless otherwise specified.

EXAMPLE I

A cast polyvinyl alcohol film (cast from Shin-Etsu Co. Type C-20 polyvinylalcohol), uniaxially stretched approximately 3.6 times its normal dimension in one direction and having a thickness of about 0.0254 mm ±0.00254 mm with a length of about 368 mm and a width of about 432 mm was mounted in an adjustable clamp. The clamp was then retracted about 25 mm to induce a slack lengthwise in the film. The clamped film was then immersed for 200 seconds in an iodine stain bath at 28° C. during which time the film relaxed, that is, became taut again. The bath comprised iodine, potassium iodide and water in a weight ratio of 1/237/4920. The clamped film was removed from the bath, allowed to drain for at least 30 seconds and then immersed in a borating solution comprising potassium iodide, boric acid, zinc chloride and water in a weight ratio of 1.02/1.25/1.0/26.49 at a temperature of about 63° C. After having been in the bath for 1½ minutes the film, while still in the bath, was stretched lengthwise to a distance of 483 mm, which represented a stretching of about 41%, over a period of 1½ minutes. At the end of this step the width of the film decreased to about 343 mm.

The film was then removed from the borating solution and allowed to drain for 5 seconds. Within 15 seconds of removal of the film from the solution both film surfaces were wiped with damp, water-wet cheese cloth wipers for about 1 minute followed by dry wiping for 2 minutes with dry tissues. The dried film was left in the clamp for a period of 2–4 minutes longer and then slit from the clamp, interleaved with paper and stored at 21° C.–24° C. and 40%–50% relative humidity.

The film was stored at these conditions for 24 hours or more. The properties of the polarizer material made according to the invention (C) and those of two commercially available polarizer materials made by prior art techniques (A and B) are listed below. Polarizer A is Polaroid Corp. HN-38S polarizer material and Polarizer B is Polaroid Corp. HN-42 polarizer material.

| POLARIZER | CONFIGURATION | PHOTOPIC % TRANSMITTANCE | DOMINANT WAVELENGTH (nm) | PERCENT PURITY |
|---|---|---|---|---|
| A | single film | 38.2 | 571 | 9.9 |
| | parallel pair | 29.3 | 572 | 19.0 |
| | crossed pair | 0.0015 | 509 | 25.5 |
| B | single film | 41.8 | 478 | 4.0 |
| | parallel pair | 34.5 | 496 | 2.0 |
| | crossed pair | 0.67 | 497 | 91.0 |
| C | single film | 41.8 | 574 | 4.0 |
| | parallel pair | 35.0 | 575 | 8.0 |
| | crossed pair | 0.0014 | 516 | 35.0 |

The data show that polarizer C is comparable in extinction properties (crossed pair) to polarizer A but has much better transmittance (parallel pair). Further polarizer C material is more neutral in color than the prior art material (an ideally neutral polarizer material exhibits near zero percent purity). The data further show that polarizer C and polarizer B have comparable transmittance properties (parallel pair) but the former has much better extinction properties (crossed pair).

Figure 3:
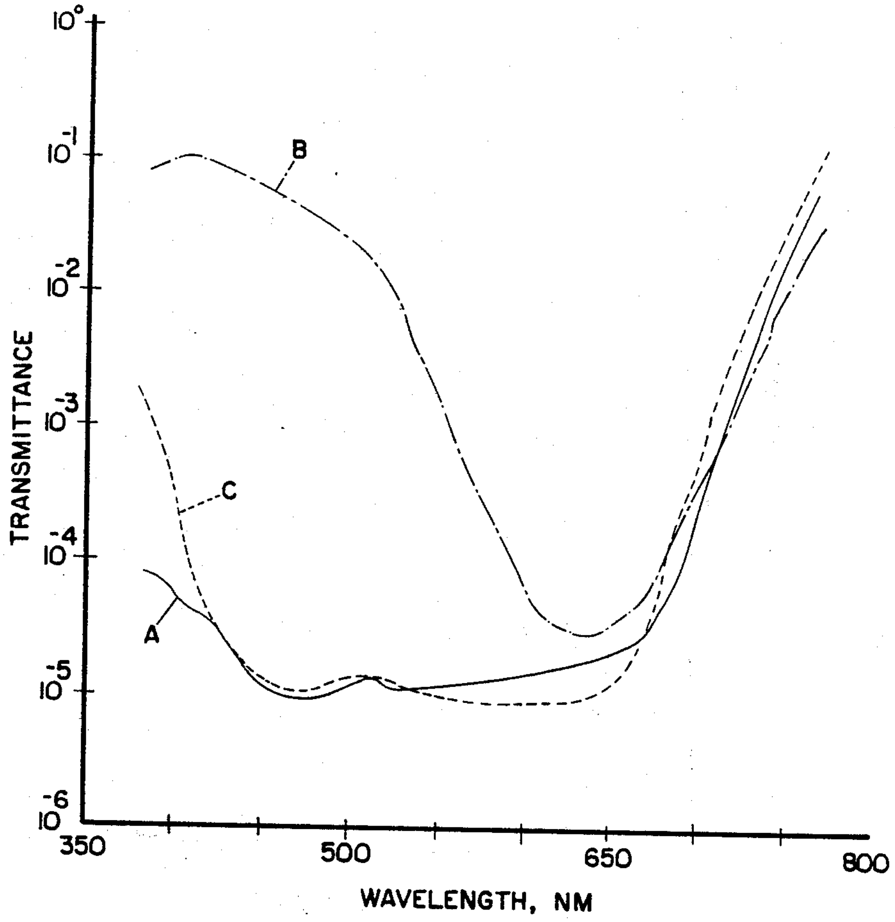
FIG. 3 is a graphical illustration showing the transmittance vs wavelength curves (crossed pair) for the polarizer elements.
Figure 2:
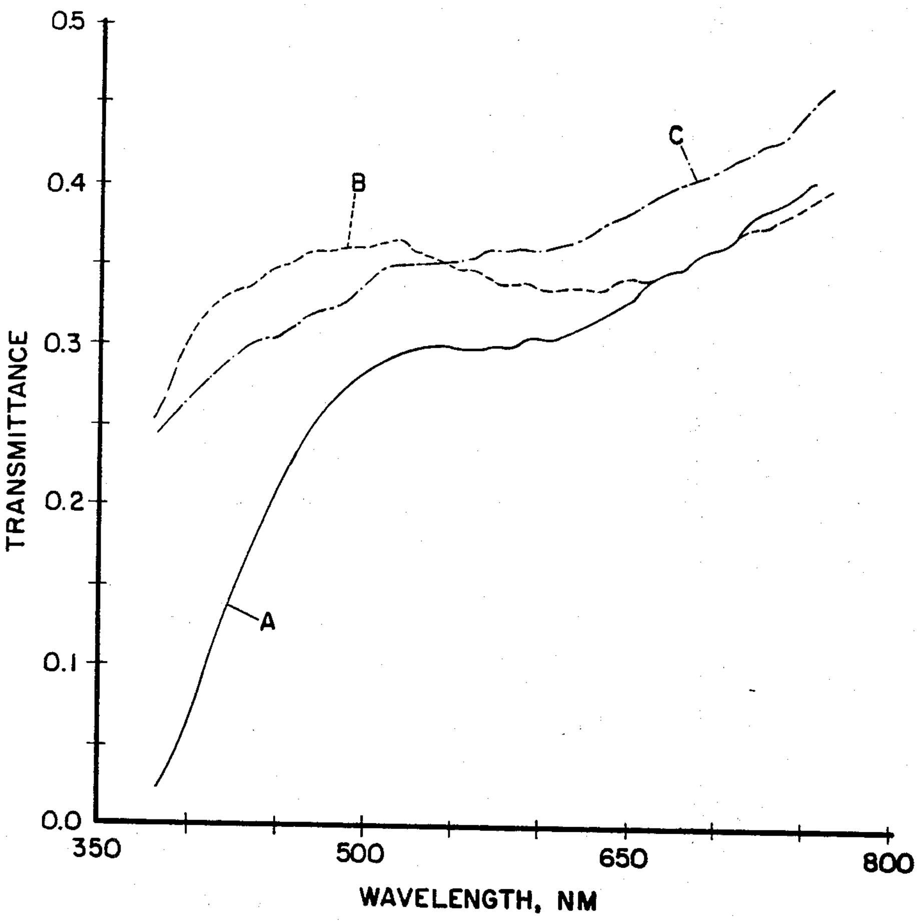
FIG. 2 is a graphical illustration showing the transmittance vs wavelength curves (parallel pair) for a dichroic polarizer according to the invention and two prior art elements.

FIG. 2 is a graphical illustration showing the transmittance vs wavelength curves (parallel pair) for polarizers A, B and C. FIG. 3 is a graphical illustration showing the transmittance vs wavelength curves (crossed pair) for these polarizers. It can be seen that the polarizer of the invention has significantly better overall properties than either of the prior art polarizers.

Although the invention has been described in detail with respect to various embodiments thereof these are intended to be illustrative only and not limiting of the invention but rather those skilled in the art will recognize that modifications and variations may be made therein which are within the spirit of the invention and the scope of the appended claims.

What is claimed is:

1. A method of making a light polarizing element comprising the steps of immersing a uniaxially stretched film of polyvinyl alcohol in an iodine stain solution, and restretching said stained film in substantially the previously uniaxially stretched direction while immersing it in a borating solution comprising an aqueous solution of boric acid, potassium iodide and zinc ion.

2. The method as defined in claim 1 wherein said uniaxially stretched film of polyvinyl alcohol is approximately 3.6 times its normal dimension in the stretched direction and wherein said restretching is from about 35% to about 50% of the stretched dimension of the film.

3. The method as defined in claim 2 wherein said restretching is about 40% of the stretched dimension of the film.

4. The method as defined in claim 1 and further include the step of relaxing said uniaxially stretched film in substantially the previously uniaxially stretched direction while it is immersed in said iodine stain solution.

5. The method as defined in claim 4 wherein said relaxing is from about 5% to about 15% of said uniaxially stretched dimension.

* * * * *